United States Patent [19]

Molthen

[11] Patent Number: 5,168,674
[45] Date of Patent: Dec. 8, 1992

[54] VACUUM CONSTRUCTED PANELS

[76] Inventor: Robert M. Molthen, 3531 Tall Pine Way, 432 C-2, Greenacres, Fla. 33463

[21] Appl. No.: 620,537

[22] Filed: Nov. 29, 1990

[51] Int. Cl.⁵ .............................................. E04B 2/46
[52] U.S. Cl. .................................... 52/2.16; 52/218; 52/303; 52/595
[58] Field of Search ....................... 52/2.16, 2.18, 2.19, 52/2.22, 218, 219, 220, 221, 745, 302, 303, 304, 198, 741, 594, 595

[56] References Cited

U.S. PATENT DOCUMENTS

| | | |
|---|---|---|
| 396,780 | 8/1908 | Walzel . |
| 946,772 | 1/1910 | Coleman . |
| 948,541 | 2/1910 | Coleman . |
| 958,095 | 5/1910 | Coleman . |
| 1,278,529 | 9/1918 | Venard . |
| 1,984,007 | 12/1934 | Babbitt . |
| 2,104,500 | 1/1938 | Van Buren . |
| 2,233,190 | 2/1941 | Amorosi . |
| 3,161,265 | 12/1964 | Matsch . |
| 4,034,526 | 7/1977 | Deslaugiers ............................. 52/220 |
| 4,050,205 | 9/1977 | Ligda ................................ 52/220 X |
| 4,385,477 | 5/1983 | Walls . |
| 4,452,230 | 6/1984 | Nelson ............................ 52/2.16 X |
| 4,471,591 | 9/1984 | Jamison . |
| 4,578,909 | 4/1986 | Henley . |
| 4,606,169 | 8/1986 | Noon . |
| 4,671,032 | 6/1987 | Reynolds . |
| 4,674,253 | 6/1987 | Young . |
| 4,712,352 | 12/1987 | Low .................................. 52/220 X |

Primary Examiner—David A. Scherbel
Assistant Examiner—Kien Nguyen
Attorney, Agent, or Firm—Alvin S. Blum

[57] ABSTRACT

The present invention relates to a method for the construction of prefabricated vacuum panels for the building of residential, commercial or industrial structures offering an extremely high insulating quality comprising; A method is disclosed whereby, a first single prefabricated constructed panel 52, containing a single interior cavity 32, can be joined and integrated to a first second prefabricated constructed panel 52, containing a single interior cavity 32, by utilizing the plurality of male protrusions 44 within the left side edge 26 of the first single contructed panel 52, penetrating and mating with the right side edge 24 of the first second panel 52 containing a plurality of female openings 36, recessed grooves 38 and gasket material 40. A method and apparatus is disclosed, wherein, an insulating material 46, can be placed within a single interior cavity 32 within a single complete panel 52 and thus, spread through the common singular interior cavity 32 contained within the plurality of completed panels 52. A further method is disclosed whereby, a vacuum can be drawn throughout the common singular interior cavity 32 within the plurality of completed panels 52. A further method and apparatus is disclosed to prevent the internal collapse of the common singular interior cavity 32 within the plurality of completed panels 52, utilizing the strap dowel 54 configuration.

4 Claims, 3 Drawing Sheets

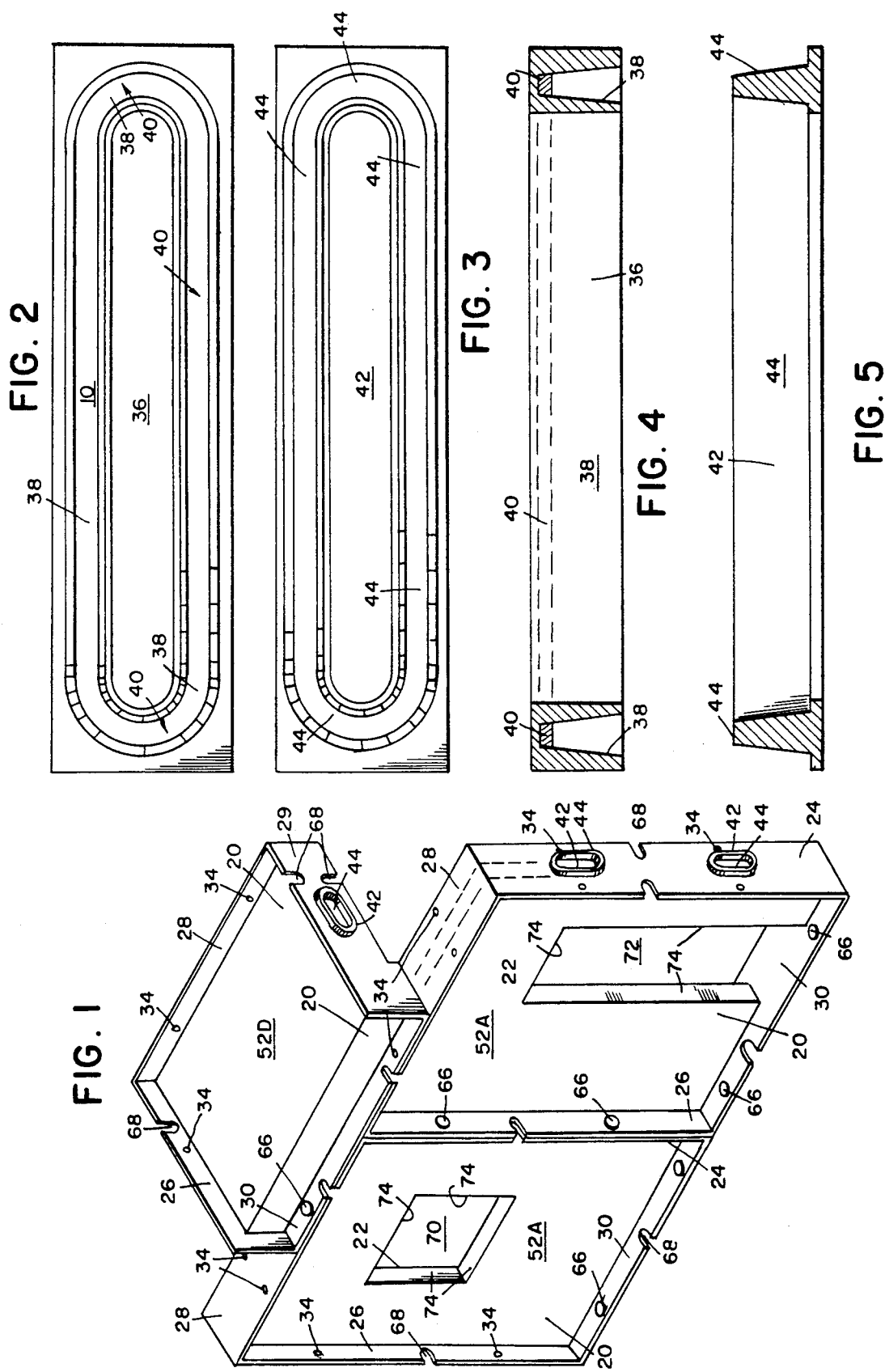

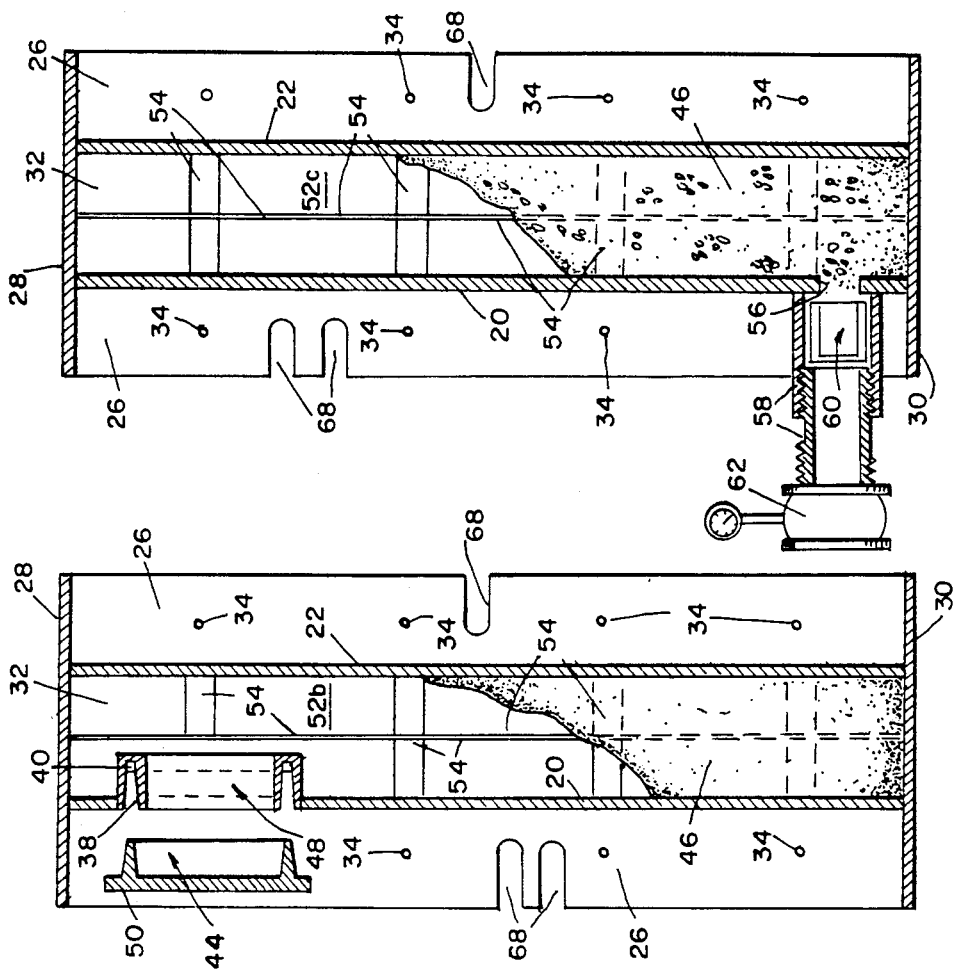
FIG. 7
FIG. 6
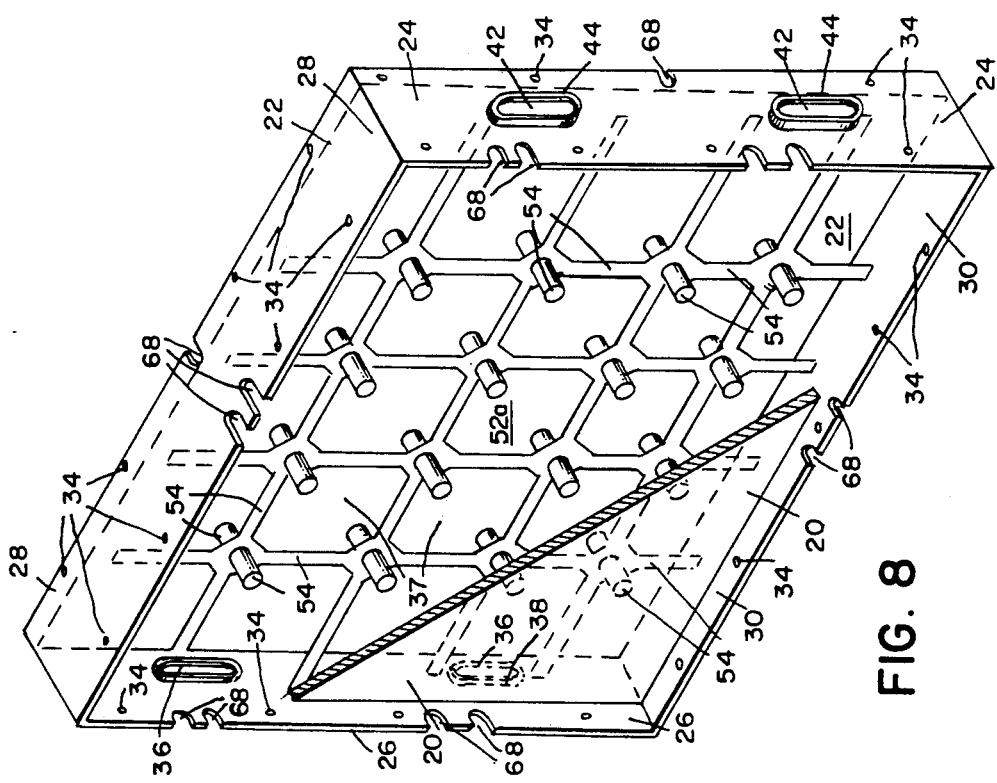
FIG. 8

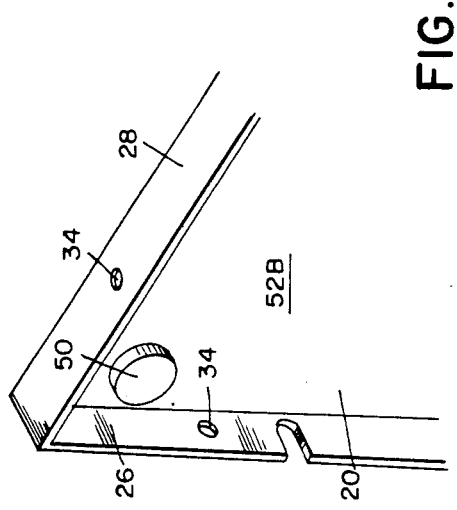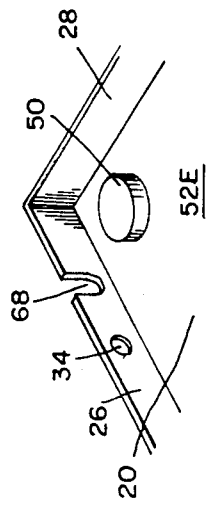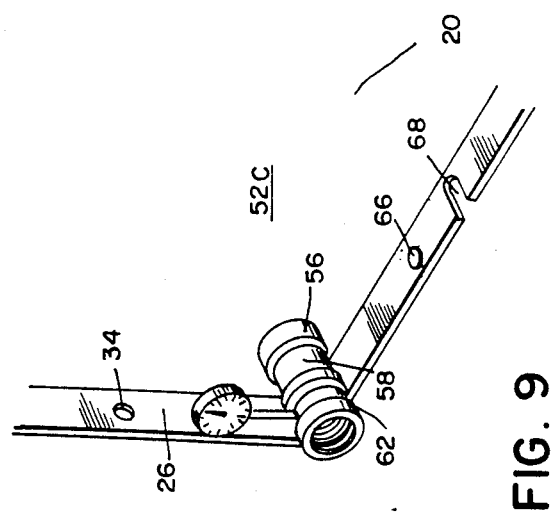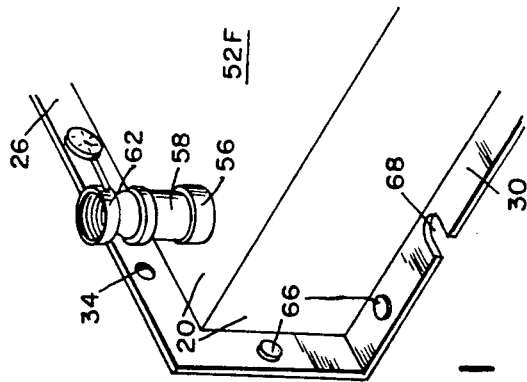

VACUUM CONSTRUCTED PANELS

FIELD OF INVENTION

This invention relates to the construction of prefabricated vacuum constructed panels within a residential, commercial or industrial structure and more specifically to a method for improving the insulating qualities within the commercial, residential or industrial structure resulting in greater retention abilities for maintaining a controlled climatic condition within a structure.

OBJECTS AND ADVANTAGES

Accordingly, several objects and advantages of my invention are as follows.

1) A construction and manufacturing method of prefabricated vacuumed constructed panels for residential, commercial or industrial structures having a much greater insulating value than present building or manufacturing processes utilizing current construction methods.

2) A construction and manufacturing method of prefabricated vacuum constructed panels for residential, commercial or industrial structures permitting the pre-construction of panels in a factory type setting thus enabling the pre-manufactured panels to be uniform in size or customized to the individuals needs.

3) A construction and manufacturing method of prefabricated vacuum constructed panels for residential, commercial or industrial structures having an I beam configuration offering added strength to the structure and also serving as a load bearing surface.

4) A construction and manufacturing method of prefabricated vacuum constructed panels for residential, commercial or industrial structures having the I beam configuration, wherein the right side, left side, and top cap plate are utilized as the means for the joining together of the individual panels, with the bottom toe plate edge having the means for securing the completed panels to a foundation, as well as to add strength and durability to the structure thus, giving added safeguards when severe storms are threatening or already in progress.

5) A construction and manufacturing method of prefabricated vacuum constructed panels for the residential, commercial or industrial structures utilizing steel sheet plates, (the preferred materials), offering the building greater security from the perils of every day life. The preferred construction materials will offer the exterior doors and windows the ability to be anchored steel to steel as opposed to steel to a forest product. This steel anchoring thereby affords greater security for the inhabitants of, or stored goods within the structure. Current methods offer the windows, doors and locking devices to be anchored to a forest product.

6) A construction and manufacturing method of prefabricated vacuum constructed panels for residential, commercial or industrial structures having the availibility of design configuration change to meet designers, builders, owners or architects requirements.

7) A construction and manufacturing method of prefabricated vacuum constructed panels for residential, commercial or industrial structures having the availibility for a vacuum to be drawn across the spectrum of the plurality of interior cavities.

8) A construction and manufacturing method of prefabricated vacuum constructed panels for residential, commercial or industrial structures having uniformity in the precut window and door openings sized and placed to individual specifications.

9) A construction and manufacturing method of prefabricated vacuum constructed panels for residential, commercial or industrial structures having a high insulating factor which will reduce the dependence on foreign energy sources.

10) A construction and manufacturing method of prefabricated vacuum constructed panels for residential, commercial or industrial structures having the primary exterior walls, ceilings or roof line made of materials that are impervious to distruction by termites.

11) A construction and manufacturing method of prefabricated vacuum constructed panels for residential, commercial or industrial structures wherein the raceways for the electrical boxes, electrical pipes and plumbing pipes are provided for.

12) A construction and manufacturing method of prefabricated vacuum constructed panels for residential, commercial or industrial structures where the need for a controlled environment with a constant temperature is required. This present invention can be constructed to meet those requirements.

13) A construction and manufacturing method of prefabricated vacuum constructed panels for residential, commercial or industrial structures that is, in itself, an interior vapor barrier and an exterior wind and water vapor barrier.

Further objects and advantages will become more apparent from a consideration of the drawings and ensuing descriptions thereof.

BRIEF DESCRIPTION OF THE DRAWINGS

FIG. 1 shows a plurality of wall panels joined to a roof line panel.

FIG. 2 shows an isolated view of the female opening, the recessed groove and gasket material contained within the left side edge.

FIG. 3 shows an isolated view of the male opening with the male protrusion contained within the left side edge.

FIG. 4 shows an isolated cross sectional view of the female opening with the recessed groove and gasket material contained within the left side edge.

FIG. 5 shows an isolated cross sectional view of the male opening and the male protrusion contained within the right side edge.

FIG. 6 shows a cross sectional view of a single completed panel having the apparatus for the introduction of the insulating material into the interior cavity.

FIG. 7 shows a cross sectional view of a single panel containing the air evacuating apparatus.

FIG. 8 shows a cut away view of a typically constructed prefabricated panel exposing the interior cavity within a single panel containing the strap dowel configuration within the interior cavity. The right side edge containing the male openings and protrusions, the left side edge containing the female openings or sealing apertures. Contained within the right side edge, left side edge, top cap edge and the bottom toe plate edge are the utility openings and hole openings.

FIG. 9 shows an isolated view of the lower portion of a typical wall panel with the vacuum valve within the front face plate, further containing the utility openings, hole openings and fasteners.

FIG. 10 shows an isolated view of the upper portion of a typical wall panel with filler cap within the front face plate having the front face plate cover in place, further containing the utility openings and hole openings.

FIG. 11 shows an isolated view of the lower portion of a typical roof line panel with the vacuum valve within the front face plate, further containing the utility openings, hole openings and fasteners.

FIG. 12 shows an isolated view of the upper portion of a typical roof line panel with filler cap within the front face plate having the front face plate cover in place, further containing the utility openings and hole openings.

DESCRIPTION OF THE PREFERRED EMBODIMENT

For the purposes of promoting and an understanding of this invention, referrences will be made to the preferred embodiment as illustrated in the drawings with specific language utilized in describing same. It is not my intention to limit the scope of this invention, since many modifications and/or alterations can be made without departing from my original intent of this invention.

The present invention provides a method for the prefabricated vacuum constructed panels having far superior insulating qualities then present methods, techniques and existing prior art teaches. The prefabricated vacuum constructed panels may come in a variety of sizes, forms and configurations, tailored to meet individual structural requirements. The present invention is well suited and readily adaptable to present day construction methods and to all exterior or interior facades. I do not wish to limit this invention to the construction of habitable buildings or storage buildings, since a variety of structures can be made from this invention.

The materials utilized in constructing this invention may vary without departing from the original intent of this invention.

When discussing the strap dowel configuration 54, the right side edge 24, with male opening 42, male protrusion 44, hole openings 34, utility openings 68, and the left side edge 26, with female opening 36, recessed groove 38, gasket material 40, hole openings 34, and utility openings 68, an implication is intended and implied, that the above mentioned components are to be included when constructing the various wall panels and roof line panels discussed within this invention regardless of shape or configuration.

The intention is implied, that, in the manufacturing of the prefabricated structural panels, the wall panels 52a and roof line panels 52d are constructed in like manner with the exception being the roof line panels 52d may contain an L type off set configuration, at an indeterminate angle, as a means to accommodate a change in direction between the roof line panel and the wall panel.

The intention is implied, that, in the manufacturing of the prefabricated structural panels, the wall panels with filler cap 52b and roof line panels with filler cap 52e are constructed in like manner with the wall panels 52a with the exception being the wall panel with filler cap 52b and roof line panel with filler cap 52e may contain a front face plate female opening 48 and a front face plate cover 50 within the upper portion of the front face plate 20. Additionally, the roof line panel with filler cap 52e may contain the L type off set configuration, at an indeterminate angle, as a means to accommodate a change in direction between the roof line panel and the wall panel.

The intention is implied, that, in the manufacturing of the prefabricated structural panels, the wall panels with vacuum valve 52c and roof line panels with vacuum valve 52f are constructed in like manner with the wall panels 52a, with the exception being the wall panel with vacuum valve 52c and roof line panel with vacuum valve 52f may contain a front face plate vacuum opening 56, a vacuum pipe 58, a porous filter 60 and a vacuum valve 62, within the lower portion of the front face plate 20. Additionally, the roof line panel with front face plate vacuum opening 56, vacuum pipe 58, porous filter 60 and vacuum valve 62 may contain the L type off set configuration, at an indeterminate angle as a means to accommodate a change in direction between the roof line panel and the wall panel, The intention is implied, that, in the manufacturing of the prefabricated structural panels, the wall panels with a return of an indeterminate angle are constructed in like manner with wall panels 52a, the exception being the wall panels with a return may contain an L type off set configuration of an indeterminate angle as the means to accommodate a change in direction for the wall panels to form a continous loop.

The intention is implied, that, in the manufacturing of the prefabricated structural panels, as a means to accommodate a two way change in direction, both being of indeterminate angles, the roof line panels are constructed in like manner with roof line panels 52d. For example: When a roof line panel 52d meets the wall panels 52a at a corner junction of 52a. The intention is implied, that, in the manufacturing of the prefabricated structural panels, a structure having a commonly referred to configuration known within the industry as a gable. The gable, in the manufacturing of the prefabricated structural panels shall be constructed in a like manner with wall panel 52a with the exception being the gable panels may contain an elongated tapered configuration.

The intention is implied, that, in the manufacturing of the prefabricated structural panels, there are no set or exact dimensions as to length, width, thickness or configurations of the panels.

In constructing the individual panels, regardless of shape or configuration, the intention is implied, that, all individually constructed panels shall contain a right side edge 24, a left side edge 26, a top cap edge 28 and a bottom toe plate edge 30, extending outwards from, and at right angles to the front face plate 20 and back face plate 22 having a greater width, then the separated distance between the front face plate 20 and the back face plate 22.

Prior to the assembly of the individually constructed panels the following alterations are made to the right side edge 24, the left side edge 26, the top cap edge 28 and the bottom toe plate edge 30. Within the right side edge 24 a plurality of sealing apertures or female openings 36, indeterminate as to number and size are cut into the facing of the right side edge 24. Permanently joined to the plurality of female openings 36 and placed at right angles to the facing, are a plurality of recessed grooves 38. Placed into the said plurality of recessed grooves 38 is a plurality of individual gasket material 40. As with the right side edge 24, the left side edge 26 has an identical number and sized male openings 42 placed within the facing. Extending outwards and at right angles to the facing, a plurality of tubulations or male protrusions 44, are permanently joined to the male openings 42.

An indeterminate number and sized hole openings 34 are placed paralell to, but inwards from, the right hand and the left hand leading edges of the right side edge 24, the left side edge 26, the top cap edge 28 and the bottom toe plate edge 30.

An indeterminate number and size utility openings 68, are cut into the leading edges, an indeterminate distance of the right side edge 24, the left side edge 26, the top cap edge 28 and the bottom toe plate edge 30.

The gasket material 40 is formed from an indeterminate material and is fitted to the configuration of the recessed groove 38. Thus, each individual female opening 36 containing an individual recessed groove 38 will contain an individual gasket material 40.

The strap dowel configuration 54 is made in the following manner: A first plurality of straps indeterminate as to material composition, length, thickness and width is placed in a horizontal fashion an indeterminate distance apart. A second plurality of straps indeterminate as to composition, length, thickness and width is placed in a horizontal position an indeterminate distance apart and at right angles to the first plurality of horizontal straps. Thus, forming a checkerboard pattern. At each and every junction, wherein, the horizontal straps cross, a hole indeterminate in size is placed into and through the crossed straps. A dowel, indeterminate as to composition and length, but of sufficient composition and length to sustain the separation of the front face plate 20 and back face plate 22, and sufficient diameter to engulf the hole placed in the junction of the crossed straps is permanently placed into the hole opening within the crossed straps.

Referring now to the drawings and in particular to FIG. 1. This figure represents a typically preferred embodiment of the vacuum constructed panels depicting a plurality of wall panels 52a joined to a single roof line panel 52d. Said wall panel 52a and said roof line panel 52d comprise a front face plate 20 and a back face plate 22 spaced an indeteminate distance apart. A right side edge 24, a left side edge 26, and a bottom toe plate edge 30 are permanently joined to the perimeter edges of the front face plate 20 and the perimeter edges of the back face plate 22. This separation of said front face plate 20 and said back face plate 22 forms the interior cavity 32, shown in FIGS. 6, 7 and 8 within said wall panel 52a or said roof line panel 52d. A strap dowel configuration 54 shown in FIGS. 6, 7 and in detail in FIG. 8, is placed within the interior cavity 32. The top cap edge 28 is then joined to the perimeter edges of the upper most part of the front face plate 20, the back face plate 22, the right side edge 24 and left side edge 26.

A plurality of indeterminate number and sized female openings 36, containing a recessed groove 38 and gasket material 40 are placed into the facing of the left side edge 26 penetrating into the interior cavity 32, shown in FIGS. 2, 4, and 8 of the wall panel 52a, wall panel with filler cap 52b, wall panel with vacuum valve 52c or the roof line panel 52d, roof line panel with filler cap 52e and roof line panel with vacuum valve 52f. Placed into the facing of the right side edge 24, FIGS. 1, 3, 5 and 8 of the wall panel 52a, wall panel with filler cap 52b, wall panel with vacuum valve 52c or the roof line panel 52d, roof line panel with filler cap 52e and roof line panel with vacuum valve 52f is a plurality of indeterminate number and sized male openings 42 containing a male protrusion 44.

A first wall panel 52a is placed adjacent to, and joined to a first second wall panel 52a mating and merging the panels together. As the mating and merging take place, said right side edge 24, containing the plurality of male openings 42 and male protrusion 44, penetrates into the plurality of female openings 36 and the plurality of recessed grooves 38, contained within the left side edge 26, seating and sealing the plurality of male protrusions 44 into the plurality of gasket material 40.

A plurality of hole openings 34, indeterminate in size and number, are placed parallel to and inwards from an indeterminate distance from the leading edges of the right side edge 24 and the left side edge 26. A plurality of fasteners 66 are placed into the plurality of hole openings 34 within the right hand and left hand side edges of the right side edge 24 of the first wall panel 52a and the left side edge 26 of the first second wall panel 52a. As the fasteners 66 are secured, the male protrusion 44 within the male opening 42 and within the right side edge 24 of the first wall panel 52a draws further into the female opening 36 seating and sealing into the recessed groove 38 and gasket material 40 of the left side edge 26 of the first second wall panel 52a. Thus, a plurality of wall panels 52a, forming a singular, common, interior cavity 32, is formed from a plurality of joined wall panels 52a, each containing an individual interior cavity 32.

Turning now to the bottom toe plate edge 30, a plurality of fasteners 66, are inserted into and through the plurality of individual hole openings 34, within the bottom toe plate edge 30 and secured to a foundation.

Within FIGS. 1, 6, 7, 8, 9, 10, 11 and 12 a plurality of utility openings 68, indeterminate as to size, number and area of placement are cut into the right side edge 24, left side edge 26, bottom toe plate edge 30 and the top cap edge 28. Thus, creating a means to introduce the electrical conduit, plumbing pipes, etc., to the structure without violating the integrity of the singular, common, interior cavity 32 within the plurality of panels.

In joining a wall panel 52a to a roof line panel 52d, the bottom toe plate edge 30 of the roof line panel 52d, is placed on the top cap edge 28 of the wall panel 52a. The plurality of fasteners 66, are placed into and through the hole openings 34 within the bottom toe plate edge 30 of roof line panel 52d and within the top cap edge 28 of wall panel 52a and secured.

FIG. 1 further depicts the installation of a window opening 70, within a wall panel 52a, wall panel with filler cap 52b or wall panel with vacuum valve 52c. A section of the front face plate 20 and back face plate 22 is cut out and removed, thus, violating the integrity of the singular interior cavity 32. The open edges into the singular, common, interior cavity 32, are then closed and resealed by permanently joining the edge strips 74, to the right side, left side, top portion and bottom portion of said window opening 70, thus, sealing the singular, common, interior cavity 32 from the exterior ambient air.

Still further FIG. 1 depicts the installation of a door opening 72, within a wall panel 52a, wall panel with filler cap 52b or wall panel with vacuum valve 52c. A section of the front face plate 20 and back face plate 22 is removed, thus, violating the integrity of the singular, common, interior cavity 32. The open edges into the singular, common, interior cavity 32, are then closed by permanently joining the edge strips 74, to the right side, left side and top portion of said door opening 72, thus, sealing the singular, common, interior cavity 32 from the exterior ambient air.

FIG. 2 represents an isolated view of the female opening 36, the recessed groove 38, and the gasket material 40 contained within the left side edge 26.

FIG. 3 represents an isolated view of the male opening 42, and the male protrusion 44 contained within the right side edge 24.

FIG. 4 represents an isolated cross sectional view of the female opening 36, the recessed groove 38 and the gasket material 40 contained within the left side edge 26.

FIG. 5 represents an isolated cross sectional view of the male opening 42 and the male protrusion 44 contained within the right side edge 24.

FIGS. 4 and 5, were viewed collectively, show the method utilized for merging the male opening 42 containing the male protrusion 44 within the right side edge 24 of a first wall panel 52a or a first second roof line panel 52d into the left side edge 26 containing the female opening 36, the recessed groove 38 and the gasket material 40 within a first second wall panel 52a or a first second roof line panel 52d.

FIG. 6, represents a cross sectional edge view of a wall panel with filler cap 52b or a roof line panel with filler cap 52e. Within the upper portion of the front face plate 20, of a wall panel with filler cap 52b or a roof line panel with filler cap 52e a female opening 48, is cut into the front face plate 20, penetrating the interior cavity 32. The front face plate female opening 48, is further fitted with a recessed groove 38 and gasket material 40. As a means to reseal and re-establish the integrity of the interior cavity 32, a front face plate cover 50, containing the male protrusion 44, is placed over the front face plate female opening 48. As the front face plate cover 50, is pressed into the recessed groove 38, the male protrusion 44, enters and penetrates the recessed groove 38, seating and sealing into the gasket material 40. Thus, a method for introducing the insulating material 46, into the singular, common, interior cavity 32, has been established. A plurality of hole openings 34, are depicted within the right hand and left hand sides of the left side edge 26.

FIG. 7, represents a cross sectional edge view of a wall panel with vacuum valve 52c or a roof line panel with vacuum valve 52f. Within the lower portion of the front face plate 20, of a wall panel with vacuum valve 52c or a roof line panel with vacuum valve 52f, a front face plate vacuum opening 56 is cut into the front face plate 20, penetrating the interior cavity 32. The front face plate vacuum opening 56, is further fitted with a vacuum pipe 58. A porous filter 60, is inserted directly into the vacuum pipe 58, and is utilized as the means to retain the insulating material 46 within the singular, common, interior cavity 32. Joined to the vacuum pipe 58 is a vacuum valve 62, which is utilized as the method to join a vacuum pump, (not shown) to the vacuum valve 62.

FIG. 8, shows a sectional view of a wall panel 52a wherein the strap dowel configuration 54, is placed between the front face plate 20 and the back face plate 22, within the interior cavity 32. The strap dowel configuration 54, also provides a method for maintaining the separation of the front face plate 20, and back face plate 22.

Within the facing of the right side edge 24, the plurality of male openings 42 having a plurality of male protrusions 44 are placed, penetrating the interior cavity 32. Additionally, the right side edge 24 contains the hole opening 34. Within the left side edge 26 are the female openings 36, or sealing apertures.

Permanently placed into the top cap edge 28 and the bottom toe plate edge 30, right side edge 24 and left side edge 26 are the hole openings 34. Placed into the right side edge 24, left side edge 26, top cap edge 28 and bottom toe plate edge are utility openings 68.

FIG. 9 represents an isolated view of wall panel with vacuum valve 52c showing the lower portion of the front face plate 20 containing the front face plate vacuum opening 56, vacuum pipe 58 and the vacuum valve 62. Within the left side edge 26, is hole opening 34. Located in the bottom toe plate 30 is the utility openings 68 and the fasteners 66.

FIG. 10 represents an isolated view of the upper portion of the wall panel with filler cap 52b showing the front face plate cover 50. Within the top cap edge 28, is found the hole opening 34. Within the left side edge 28, are the utility openings 68 and hole openings 34.

FIG. 11 represents an isolated view of the roof line panel with vacuum valve 52f showing the lower portion of the front face plate 20 containing the front face plate vacuum opening 56, vacuum pipe 58 and the vacuum valve 62, (porous filter 60, not shown). Within the left side edge 26, is hole opening 34 and fasteners 66. Located in the bottom toe plate edge 30 is the utility openings 68 and the fasteners 66. In this view, the L type off set configuration is also depicted.

FIG. 12 represents an isolated view of the upper portion of the roof line panel with filler cap 52e showing the front face plate cover 50 and the top cap edge 28. Within the left side edge 28, are the utility openings 68 and hole openings 34.

While the above description contains many specificities, these should not be construed as limitations on the scope of the invention, but rather as an exemplification of one preferred embodiment thereof. I do not restrict myself to the details as shown or described herein, since many modifications can be made therein without departing from the essential features of my invention.

BROADENING PARAGRAPH

For example:

The plurality of wall panels and roof line panels may contain a plurality of stud stubs, indeterminate as to length, placed inside and running in a vertical upright position within the singular, common, interior cavity as a means to further strengthen the I beam configuration for a load bearing surface.

Additionally the vacuum constructed panels may be of a singular, continous, extended wall or roof line panel containing a singular, common, interior cavity, constructed without the right side edge containing the male openings, male protrusions, or the left side edge containing the female openings, recessed grooves or gasket material.

This invention has the adaptability to a variety of other configurations to accomodate a variety of needs. With the formulation of an open ended box, containing a top, bottom, right side, left side, and a back, containing a singular, common, inter cavity within the walls, a refrigerator, freezer, oven can be easily constructed. Within the singular, common interior cavity, the strap dowel configuration is utilized as the separator and perlite as the insulator. A means for drawing a vacuum is provided by utilizing a vacuum opening, a vacuum pipe, a porous filter and vacuum valve installed within a section of the wall structure. A means for the filling of the insulating material, perlite being the preferred material, is provided with the installation of a front face plate vacuum opening, a front face plate female opening, a recessed groove and gasket material placed into a section of the wall structure. Additionally, the entrance doors to the above mentioned components can be of like construction and remain separate but hinged to the desired component. Thus, a domestic or commercial refrigerator, oven, or stove, having the means to be heated, cooled or freezing depending on what the particular needs are is also available. Further, the construction configuration can be further altered to a cylinder type form containing the above mentioned design to accomodate a hot water heater. The exception being that with a gas heater, the bottom portion will require a single plate conventional construction method without the benefit of a vacuum being drawn on the bottom plate.

In concluding the above physical description, the following is claimed as new:

1. A plurality of vacuum panels for joining together to construct an insulated enclosure, each vacuum panel comprising:
   A) a frame having straight sides defining an enclosed planar space, the frame having an inner surface directed toward the space and an outer surface directed away from the space;
   B) two opposed face plates arranged parallel to one another and spaced apart from one another by a predetermined distance, each plate joined in airtight connection to the inner surface of said frame so as to form an evacuatable air-tight chamber between said plates and said frame;
   C) at least one male tubulation extending from said outer surface of said frame, said tubulation being in fluid communication with said chamber;
   D) at least one sealable aperture through said outer surface of said frame, said aperture being in fluid communication with said chamber;
   E) said tubulation and said sealable aperture arranged for sealably cooperating with a sealable aperture and a tubulation of adjacent panels to thereby form air-tight communication between chambers of juxtaposed panels to enable combined evacuation of air from the panels joined by said tubulations and apertures;
   F) a plurality of spacer means for maintaining spacing between said face plates, each spacer means having a length equal to the distance between opposed plates; and
   G) spacer positioning means connected to said spacer means for holding said spacer means perpendicular to said face plates and spaced apart from one another in a predetermined pattern.

2. The vacuum panels according to claim 1, in which a portion of said frame extends outward from each said plate and away from said chamber to thereby provide flange elements on both sides of said chamber, said flange elements provided with joining means for mechanically joining adjacent panels together.

3. The vacuum panels according to claim 1, further comprising at least one access port in at least one plate of at least one panel, said access port in fluid communication with said chamber and provided with means for connection to at least one member of the group consisting of vacuum pump means for evacuating the air from said chambers, sealing means for sealing said access port air-tight, filling means for admitting a supply of insulating material, and filter means for filtering air aspirated from the chamber.

4. A plurality of vacuum panels for joining together to construct an insulated enclosure, each vacuum panel comprising:
   A) a frame having straight sides defining an enclosed planar space, the frame having an inner surface directed toward the space and an outer surface directed away from the space;
   B) two opposed face plates arranged parallel to one another and spaced apart from one another by a predetermined distance, each plate joined in airtight connection to the inner surface of said frame so as to form an evacuatable air-tight chamber between said plates and said frame;
   C) at least one male tubulation extending from said outer surface of said frame, said tubulation being in fluid communication with said chamber;
   D) at least one sealable aperture through said outer surface of said frame, said aperture being in fluid communication with said chamber; and
   E) said tubulation and said sealable aperture arranged for sealably cooperating with a sealable aperture and a tubulation of adjacent panels to thereby form air-tight communication between chambers of juxtaposed panels to enable combined evacuation of air from the panels joined by said tubulations and apertures.

* * * * *